US010258986B2

(12) United States Patent
Zukas et al.

(10) Patent No.: US 10,258,986 B2
(45) Date of Patent: Apr. 16, 2019

(54) VISCOELASTIC FLUID DROP PRODUCTION

(71) Applicant: University of New Hampshire, Durham, NH (US)

(72) Inventors: Brian G. Zukas, Fremont, NH (US); Nivedita Gupta, Newmarket, NH (US)

(73) Assignee: University of New Hampshire, Durham, NH (US)

(*) Notice: Subject to any disclaimer, the term of this patent is extended or adjusted under 35 U.S.C. 154(b) by 446 days.

(21) Appl. No.: 14/935,917

(22) Filed: Nov. 9, 2015

(65) Prior Publication Data

US 2016/0132060 A1 May 12, 2016

Related U.S. Application Data

(60) Provisional application No. 62/078,497, filed on Nov. 12, 2014.

(51) Int. Cl.

| | |
|---|---|
| ***G05D 7/00*** | (2006.01) |
| ***B01L 3/00*** | (2006.01) |
| ***B33Y 70/00*** | (2015.01) |

(52) U.S. Cl.

CPC ......... *B01L 3/502784* (2013.01); *B33Y 70/00* (2014.12); *B01L 2200/0673* (2013.01); *B01L 2300/0864* (2013.01); *B01L 2400/0457* (2013.01); *B01L 2400/0469* (2013.01); *B01L 2400/0478* (2013.01); *B01L 2400/0487* (2013.01)

(58) Field of Classification Search

CPC combination set(s) only.
See application file for complete search history.

(56) References Cited

U.S. PATENT DOCUMENTS

| | | | |
|---|---|---|---|
| 4,007,792 | A | 2/1977 | Meister |
| H0001099 | H | 9/1992 | Sayler |

(Continued)

FOREIGN PATENT DOCUMENTS

| | | | |
|---|---|---|---|
| EP | 0 974 320 | A1 | 1/2000 |
| EP | 2 332 595 | A2 | 6/2011 |
| WO | 2004/038363 | A2 | 5/2004 |

OTHER PUBLICATIONS

Cross, M. Relation between viscoelasticity and shear-thinning behaviour in liquids; Rheol. Acta 18, 609-614 (1979).*

(Continued)

*Primary Examiner* — Brian R Gordon
(74) *Attorney, Agent, or Firm* — Finch & Maloney PLLC

(57) ABSTRACT

Techniques are disclosed for producing a drop of a viscoelastic fluid. A separation volume of viscoelastic fluid that is to form a drop from a larger remnant volume of viscoelastic fluid is moved from through an interface and into a cross-channel. Movement subjects the viscoelastic fluid to shear that may cause a reduction in viscosity. Movement of the viscoelastic fluid is then reduced or stopped (i.e., the rate at which shear is applied is reduced), such that the viscosity of the viscoelastic fluid may increase as the viscoelastic fluid experiences relaxation. The separation volume of viscoelastic fluid is then moved down the cross-channel in a first direction by the flow of an immiscible fluid, which separates the separation volume from a remnant volume. The separation volume may then be dispensed from the cross-channel as a drop.

24 Claims, 9 Drawing Sheets

(56) References Cited

U.S. PATENT DOCUMENTS

| | | | | |
|---|---|---|---|---|
| 6,258,859 | B1 * | 7/2001 | Dahayanake | A61K 8/02 516/77 |
| 7,001,362 | B2 | 2/2006 | Vincent | |
| 7,129,091 | B2 | 10/2006 | Ismagilov et al. | |
| 7,416,370 | B2 | 8/2008 | de Larios et al. | |
| 7,485,670 | B2 | 2/2009 | Ruberti et al. | |
| 7,536,962 | B2 | 5/2009 | Eastin et al. | |
| 7,704,457 | B2 * | 4/2010 | Patton | B01F 5/0646 422/63 |
| 7,827,704 | B2 | 11/2010 | Fox et al. | |
| 8,252,385 | B2 | 8/2012 | Ittel et al. | |
| 8,268,633 | B2 * | 9/2012 | Ramsey | B01F 5/0471 422/502 |
| 8,273,573 | B2 | 9/2012 | Ismagilov et al. | |
| 8,304,193 | B2 | 11/2012 | Ismagilov et al. | |
| 8,663,561 | B2 * | 3/2014 | Patton | B01F 5/0646 250/372 |
| 8,765,485 | B2 * | 7/2014 | Link | B01F 5/0655 422/502 |
| 9,789,482 | B2 * | 10/2017 | Link | B01L 3/5027 |
| 2005/0161477 | A1 | 7/2005 | Strecker et al. | |
| 2007/0235546 | A1 | 10/2007 | Strecker et al. | |
| 2008/0124726 | A1 * | 5/2008 | Monforte | B01L 3/502784 435/6.12 |
| 2011/0285042 | A1 | 11/2011 | Viovy et al. | |
| 2012/0132288 | A1 * | 5/2012 | Weitz | B01F 5/0471 137/13 |
| 2012/0211084 | A1 * | 8/2012 | Weitz | B01F 3/0807 137/1 |
| 2012/0277129 | A1 | 11/2012 | Li et al. | |
| 2014/0024023 | A1 * | 1/2014 | Cauley, III | B01L 3/502784 435/6.1 |
| 2015/0034163 | A1 * | 2/2015 | Abate | B01F 5/0471 137/1 |
| 2015/0298157 | A1 * | 10/2015 | Weitz | B06B 1/06 239/4 |
| 2017/0354937 | A1 * | 12/2017 | Weitz | B01F 5/0471 |
| 2017/0361318 | A1 * | 12/2017 | Weitz | B01F 13/0074 |

OTHER PUBLICATIONS

Zukas, Brian, “Encapsulation of Anti-Traction Material”, Thesis, University of New Hampshire, Nov. 2014, 104 pages.

* cited by examiner 200
208
206
210
Immiscible
Fluid
215
203
201
202

204
206
208
210
Immiscible
Fluid
Immiscible
Fluid
201
202

217
204
206
208
210
Immiscible
Fluid
215
203
212
202

208
206
204
210
Immiscible
Fluid
212

(c)

VISCOELASTIC FLUID DROP PRODUCTION

CROSS REFERENCE TO RELATED APPLICATIONS

This application claims priority to U.S. Provisional Application No. 62/078,497, filed on Nov. 12, 2014, and entitled Viscoelastic Fluid Drop Production, which is incorporated by reference herein in its entirety.

FIELD OF THE DISCLOSURE

The present disclosure relates to viscoelastic fluid drop formation, and more particularly to fluid drop formation in a manner that is precise and repeatable.

BACKGROUND

Viscoelastic fluids exhibit some viscous properties also associated with Newtonian fluids, such as water and oil, as well as elastic properties associated with elastic materials, such as rubber. When deformed, viscoelastic fluids resist shear and strain similar to Newtonian fluids. However, unlike Newtonian fluids, the manner in which shear and strain are resisted depends on the rate at which shear and/or strain is applied. That is, for viscoelastic fluids the relationship between stress and strain varies with a duration of time over which a stress or strain is applied, and the rate at which the stress or strain is applied. Examples of time dependent behavior that viscoelastic materials may exhibit, to varying degrees, include increases in strain in response to a stress applied over time (i.e., creep) and/or decreases in stress in response to continually applied strains (i.e., stress relaxation). Some viscoelastic fluids experience shear thinning, which is a decrease in viscosity that accompanies an increase in shear rate.

Viscoelastic fluids are present in a wide variety of applications, including cosmetics, 3D printing, ink jet printing, biological fluid handling (e.g., mucous, sputum), adhesives, and the like. Conventional approaches for forming drops from viscoelastic fluids include the use of tools normally employed for Newtonian fluids, such as agitation, emulsion formation, shear application by valves, and the like. These techniques, when applied to viscoelastic fluids, often result in the formation of long strands that, when pulled, stretch between the drop being formed and the reservoir of material. This phenomenon, often referred to as "beads on a string" phenomena, prevents repeatable formation of fluid drops having desired volumes.

DETAILED DESCRIPTION

Overview

Techniques described herein relate to forming a drop of a viscoelastic fluid. The drop may be produced with a desired volume in a repeatable manner. As used herein, viscoelastic fluid processed through embodiments of the present disclosure includes a "separation volume" and a "remnant volume." Separation volume refers to a sub-portion of fluid separated from a reservoir of fluid. The portion of the fluid remaining in the reservoir from which a sub-portion is separated is termed the remnant volume. The separation volume ultimately forms a drop of viscoelastic fluid when processed according to embodiments described herein. Viscoelastic fluids, as referenced herein, are fluids that behave with a relationship between stress and strain that varies with time, particularly for shear rates and/or strain rates near zero. Viscoelastic fluids typically have a non-zero storage modulus (G').

According to one example embodiment, a separation volume of viscoelastic fluid is moved from a feed pathway of a feed channel and into a flow pathway of a cross-channel of a "T" shaped channel. Movement of the viscoelastic fluid through the channels subjects the viscoelastic fluid to shear that may cause a reduction in viscosity. To allow viscosity to increase, movement of the viscoelastic fluid may be reduced or stopped (i.e., the rate at which shear is applied is reduced) to promote stress relaxation. After a period of time, a separation volume of viscoelastic fluid may be moved within the flow pathway of the cross-channel using pressure applied to a surface of the separation volume by a flow of an immiscible fluid through a portion of the cross-channel. Moving the separation volume in this manner causes the separation volume to separate from the remnant volume in the feed channel, thereby producing a drop when the separation volume is ultimately issued from the cross channel remnant. This also prevents further movement of the remnant volume in the feed channel beyond an intersection of the feed channel and the cross-channel. Urging the separation volume against an interface at an intersection between the feed channel and the cross channel may aid separation.

A direction of flow of the separation volume in the cross channel is then reversed. The reversed direction is, in some embodiments toward an outlet. The separation volume is then dispensed from the outlet of the flow pathway as a drop of viscoelastic fluid.

Illustration of Viscoelastic Behavior

Figure 1A:
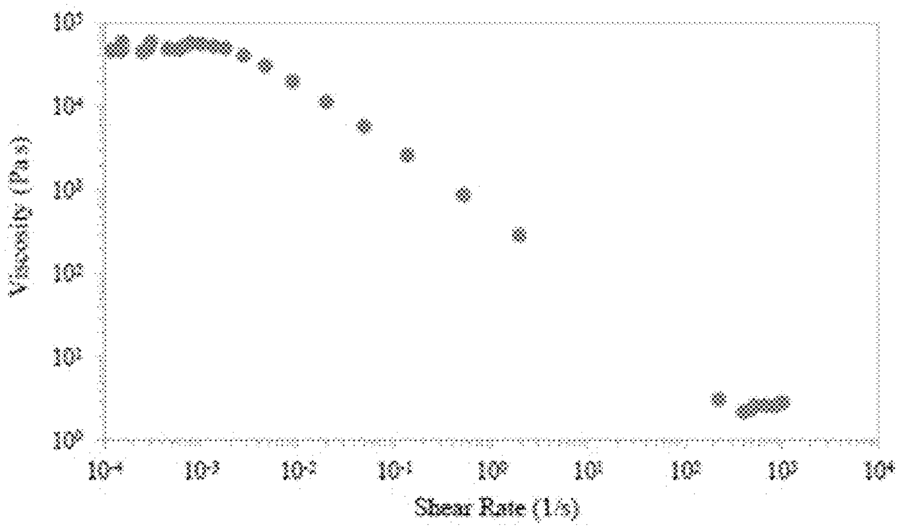
(Prior Art) Fig. 1a
FIGS. 1*a* and 1*b* show viscosity as a function of shear rate for two different concentrations of a polyacrylamide viscoelastic fluid, as measured in relation to an embodiment of the present disclosure.
Figure 1B:
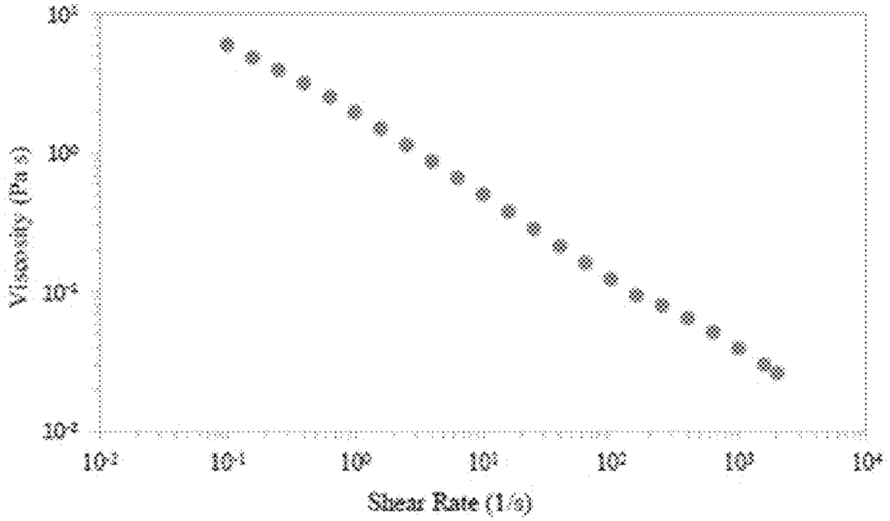
(Prior Art) Fig. 1b

Viscoelastic fluids, as referenced herein, are fluids that behave with a relationship between stress and strain that varies with time, particularly for shear rates and/or strain rates near zero. Viscoelastic fluids typically have a non-zero storage modulus (G'). FIGS. 1*a* and 1*b* are curves that display viscosity of polyacrylamide (PAM), a type of viscoelastic fluid, as a function of shear rate. FIG. 1*a* illustrates viscosity as a function of shear rate for a 9.09 weight % PAM solution in water at 25 degrees centigrade. FIG. 1*b* shows viscosity as a function of shear rate for a 0.909 weight % PAM solution at 25 degrees centigrade. As shown, PAM is one type of viscoelastic fluid that experiences shear thinning (i.e., a reduction in viscosity) as shear rates are increased.

While FIGS. 1*a* and 1*b* show viscosity and shear rate for PAM, it will be appreciated that most polymer solutions (i.e., polymer molecules dissolved in a strong or weak solvent) may exhibit viscoelastic behavior. Polymers not in solution or swelled by a solvent may also exhibit viscoelastic behavior depending on the forces applied to the polymer, the rate at which the forces are applied, the temperature of the polymer relative to its glass transition temperature, the structure and composition of the polymer, itself, and other factors. During processing of a bulk polymer (e.g., a molten polymer), a swelled polymer, or a polymer solution, any of which may exhibit viscoelastic behavior, the "beads on a string" phenomenon may prevent discrete drop formation due to long filaments of polymer (i.e., the "string") connecting the drops (i.e., the "beads"). The beads on a string phenomenon may, additionally or alternately, prevent precise control of drop volume and/or cause the formation of satellite drops (i.e., drops that trail a primary drop). For viscoelastic fluids that include structures such as beads, strings, or satellite drops, drop formation may prove more successful when conducted near or at the zero shear rate viscosity of a viscoelastic fluid, such as through the techniques described herein. FIGS. 1*a* and 1*b* show how viscosity decreases with increasing shear rate for one type of viscoelastic fluid. Curves for other types of viscoelastic fluids and/or over different shear rates may exhibit different characteristics, including viscosities that increase with shear rate. It is moreover to be appreciated that viscoelastic fluids, as referenced in the present disclosure, are not limited to PAM or to those exhibiting characteristics like those shown in FIGS. 1*a* and 1*b*.

Example Device and Application

FIGS. 2*a-d* schematically present process snapshots for a process of generating a drop of viscoelastic fluid without the "beads on a string" phenomenon using an example device of the present disclosure. FIGS. 2*a-d* show some or all of a viscoelastic fluid 201 (shaded) disposed in a feed pathway 202 of a "T" shaped channel structure 200, an "immiscible fluid" (not shaded) that is immiscible with the viscoelastic fluid 201. The "T" shaped channel structure 200 includes a feed channel 203, a flow pathway 206, a cross channel 208, a drop outlet 210, and an interface 215.

Figures 2A, 2B, 2C, 2D:
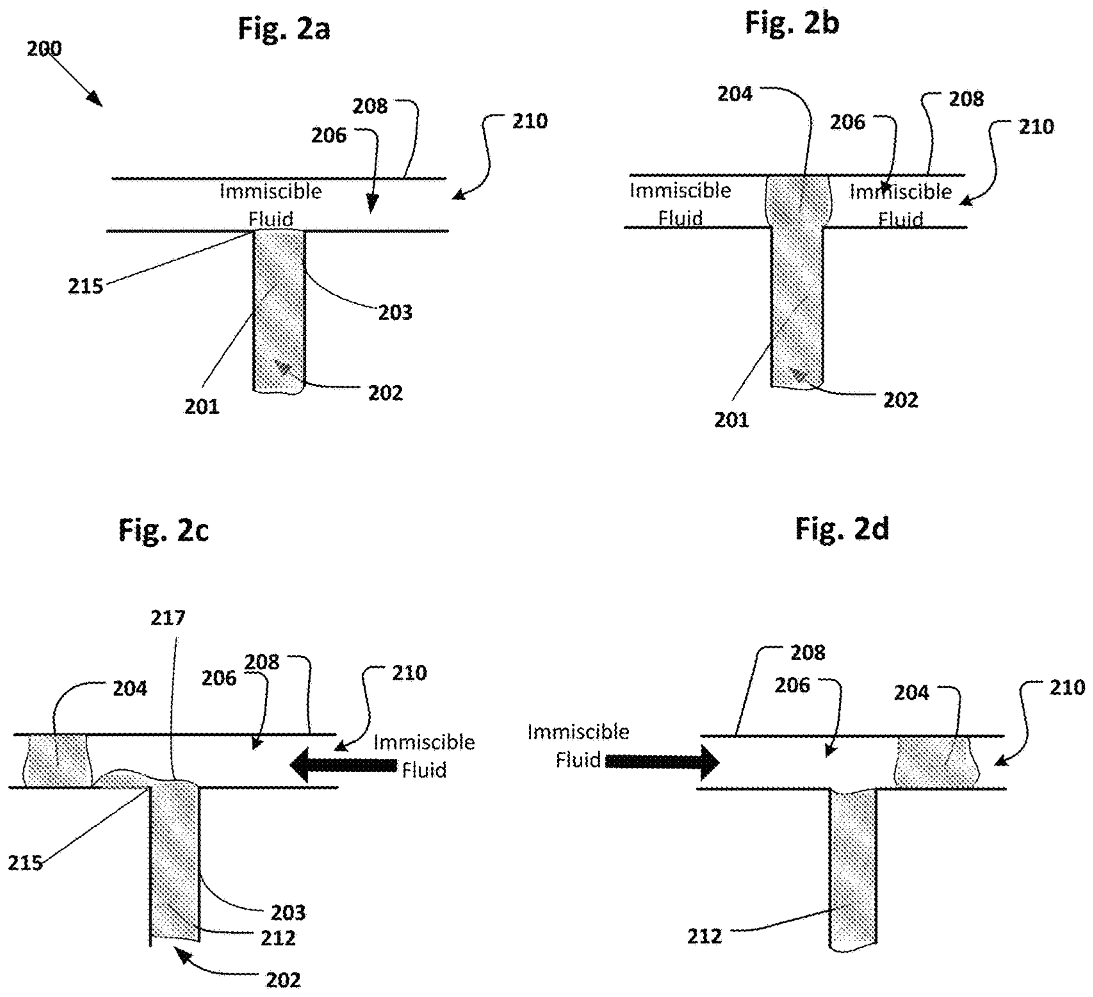
FIGS. 2*a*-2*d* show a progression of acts that may be employed in a method of producing a viscoelastic fluid drop, according to an embodiment of the present disclosure.

FIG. 2*a* illustrates an initial condition for a process of drop formation. As shown in FIG. 2*a*, viscoelastic fluid 201 is disposed within feed pathway 202 of the feed channel 203 of "T" shaped channel structure 200. The immiscible fluid is disposed in the flow pathway 206 of the cross channel 208 of the "T" shaped channel structure 200. No viscoelastic fluid is disposed within the flow pathway 206 of the cross channel 208 for two reasons: (1) no pressure is yet applied to the viscoelastic fluid 201 and (2) the immiscible fluid in the flow pathway 206 acts as a barrier to diffusional (i.e., un-forced) flow of the viscoelastic fluid out of the feed pathway 202. In this initial condition, because no shear stress or strain is applied to the viscoelastic fluid 201, the viscoelastic fluid has a viscosity at a higher range of possible values of the viscoelastic fluid, such as those shown at low shear rates in FIGS. 1*a* and 1*b*.

FIG. 2*b* illustrates a next step of a process in which the viscoelastic fluid 201 is urged along the feed pathway 202 of feed channel 203 so that a separation portion 204 of the fluid moves into a flow pathway 206 of the cross channel 208. The separation portion 204, not yet separated from the viscoelastic fluid 201, displaces the immiscible fluid previously filling the flow pathway 206 of the cross channel 208. The separation portion 204 is contained within the flow pathway 206 of the cross channel 208 by the immiscible fluid remaining in the cross channel 208 on both sides of the separation portion 204 and by stress relaxation, as described below.

A force (not shown) is applied to the viscoelastic fluid 201 to facilitate urging of the viscoelastic fluid 201 into the flow pathway 206 of the cross channel 208, as shown in FIG. 2*b*. The force can be applied by any convenient means, such as by a plunger, an immiscible fluid, or gravity exerted through a reservoir (not shown) of viscoelastic fluid. After the force facilitates advancement of the separation portion 204 of the viscoelastic fluid 201 into flow pathway 206 of the cross channel 208, the application of the force is stopped. No (or low) force(s) are applied to the viscoelastic fluid 201 for a period of time, thus reducing or eliminating movement of the fluid in the feed pathway and thereby promoting stress relaxation.

As shown in FIG. 2*c*, an immiscible fluid is advanced through the flow pathway 206 of the cross channel 208 to separate the separation portion 204 from the remnant portion 212 of the viscoelastic fluid 201 that remains in the feed channel 203. One benefit of using an immiscible fluid to separate the separation portion 204 from the remnant portion 212 is that the immiscible fluid contains the remnant portion 212 in the feed channel 203. In some embodiments, a string 217 of polymer (i.e., of the "beads on a string" phenomenon) may connect the separation portion 204 and the remnant portion 212. Removal of the string 217, for the embodiments in which the string is present, will be described below.

In one embodiment, a separation portion 204 of viscoelastic fluid may be urged against an interface 215 between a feed channel 203 and a cross channel 208 to promote separation of the separation portion from the remnant portion. In one example, the interface 215 is an edge formed by the feed channel 203 and the cross channel 208 intersecting at a junction. By way of example, FIG. 2*c* shows a separation portion 204 being urged against an upstream edge of an interface 215 of a junction between a feed channel 203 and a cross channel 208 of a "T" shaped structure. The force is applied to the separation portion 204 through the immiscible fluid (as shown), promoting separation of the separation portion 204 from the remnant portion 212. In some embodiments, the interface 215 is linear because the junction between an example feed channel 203 and an example cross channel 208 is rectangular in shape because the example feed channel 203 and the example cross channel 208 have rectangular cross sections. However, in other examples, the interface 215 may include rounded interface shapes and/or edges. According to some embodiments, an interface 215 may have other configurations to promote separation of the separation portion 204 from the remnant portion 212, for example by joining a feed channel 203 and a cross channel 208 at an acute angle, rather than a right angle as in the embodiment of FIGS. 2*a*-2*d*, so that the interface 215 is more blade-like. The flow pathway 206 and the feed pathway may, additionally or alternately, may have different cross sectional shapes and/or sizes, according to some embodiments.

The remnant portion 212 of viscoelastic fluid may be prevented from moving farther into the flow pathway 206 or even immobilized as a separation portion 204 is urged along the flow pathway 206. According to some embodiments, this may be accomplished by holding the remnant portion 212 in the feed pathway 202 with pressure (e.g., from the immiscible fluid used to move the remnant portion 204) and/or, vacuum as the separation portion 204 is moved in the flow pathway 206. Additionally or alternately, pressure may be applied against a face of the remnant portion adjacent to the flow pathway 206 of the cross channel 208, as shown in FIG. 2*c*, that is revealed as the separation portion is moved away from the remnant portion in the flow pathway 206.

The separation portion 204 may be moved into a flow pathway 206 at least until the separation portion 204 occupies a full cross sectional area of the flow pathway 206. In this respect, movement of an immiscible fluid in the flow pathway 206 and/or a pressure differential at different sides of the flow pathway 206 may better urge the separation portion 204 in one direction or another. The immiscible fluid is prevented from passing by the separation portion 204 in the flow channel 208. As may be appreciated, the cross-sectional area of the flow pathway 206 in combination with the width of the feed pathway 202 may define a minimum drop size for a particular embodiment. Flow pathway 206 and/or feed pathway 202 cross sectional size and/or shapes may thus be set by designers to adjust or define a minimum drop size and/or drop shape for a particular application.

Then, as shown in FIG. 2*d*, direction of flow of the separation portion is reversed by application of a force transmitted to a face of the remnant portion opposite to the face described above in the context of FIG. 2*c* that caused separation of the separation portion 204 from the remnant portion 212. This force is applied via the immiscible fluid. At this stage, the separation portion 204 moves towards the drop outlet 210 along the flow pathway 206, passing the feed channel and, optionally, collecting the string 217 en route. Thus, the string 217 is removed prior to the separation portion 204 issuing as a drop from the drop outlet 210. As described above, the beads on a string phenomenon may, additionally or alternately, prevent precise control of drop volume and/or cause the formation of satellite drops. For viscoelastic fluids prone to exhibiting "beads on a string" behavior during drop dispensing, the likelihood of discrete drop formation may improve when the dispensing is conducted near, or at, the zero shear rate viscosity of a viscoelastic fluid, such as through the techniques described herein.

Figure 3:
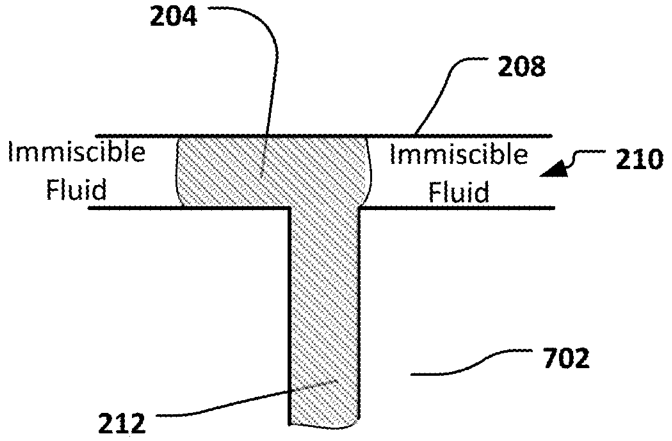
FIG. 3 shows a flow pathway being filled with viscoelastic fluid, according to an embodiment of the present disclosure.

The flow pathway 206 may be filled with viscoelastic fluid beyond an amount that occupies a full cross section of the flow pathway 206, as shown for example in the embodiment of FIG. 3. In this respect, drops may be produced that have volumes greater than the cross-sectional area of the flow pathway 206 multiplied by a width of the feed pathway 202. Moreover, a particular feed channel 203 and cross channel 208 may be used to produce drops having varying volumes by introducing different volumes of viscoelastic fluid into the flow pathway 206, cycle to cycle, as drops are formed.

The viscoelastic fluid may be moved through the feed pathway 202 and into the flow pathway 206 in various manners. According to some example embodiments, a syringe pump pushes the remnant portion 212 of the viscoelastic fluid through the feed pathway 202, either by acting directly on the viscoelastic fluid or through an immiscible intermediary fluid. Any immiscible fluid in the flow pathway 206 may be under minimal or no pressure and/or in a motionless state, such that the introduction of the separation portion 204 into the flow pathway 206 easily displaces the immiscible fluid, according to some example embodiments. Alternately, fluid in the flow pathway 206 may be actively controlled through a pump, vacuum, or other mechanism to urge the separation portion 204 in a particular direction as the separation portion 204 enters the flow pathway 206. According to some embodiments, immiscible fluid may urge a separation portion 204 of viscoelastic fluid in one direction or another, as the immiscible fluid is moved into the flow pathway 206.

The shear rate applied against the viscoelastic fluid may be reduced and/or eliminated once a desired volume of viscoelastic fluid is positioned in the flow pathway 206. Equivalently, strain applied against the viscoelastic fluid may be held substantially constant. In this respect, viscosity of the viscoelastic fluid may increase as stress relaxation occurs. Stress relaxation and/or an increase in viscosity is accompanied by an increase in resistance to deformation. Increased resistance to deformation may allow either or both of the separation portion 204 and remnant portion 212 to move independently of one another in a manner that prevents the beads on a string phenomenon.

The degree to which the shear rate is reduced and/or the amount of time during which relaxation occurs may depend on various factors, including the particular viscoelastic fluid, the concentration of the viscoelastic fluid, temperature, the shear rate applied to move the viscoelastic fluid into the flow pathway 206, geometry of the cross channel 208 and/or feed channel 203 and the like. According to some embodiments, viscoelastic fluid is immobilized to allow stress relaxation and/or an increase in viscosity, and maybe immobilized for up to 0.01 seconds or more, up to 0.1 seconds or more, up to 0.25 seconds or more, up to 0.5 seconds or more, up to 1.0 seconds or more, up to 2 seconds or more, up to 5 seconds or more, up to 10 seconds or more, up to 30 seconds or more, and up to 60 seconds or more, or greater amounts of time.

After viscosity of the viscoelastic fluid is allowed to increase, the separation portion 204 of viscoelastic material may be moved in the flow pathway 206 to initiate separation from the remnant portion 212. According to some embodiments, the separation portion 204 is initially moved away from the drop outlet 210 in the flow pathway 206, as described with respect to the embodiment of FIGS. 2*a*-2*d*. Initially moving the separation portion 204 away from the drop outlet 210 may prevent long filaments from forming between the separation portion 204 and the remnant portion 212, due to the manner in which any polymers or other long filaments in the viscoelastic fluid may become arranged during this motion.

A separation portion 204 of a viscoelastic fluid may be moved away from the drop outlet 210 in the flow pathway 206 (i.e., upstream in the flow pathway 206) different distances. The distance to which a separation portion 204 is moved may, for the sake of convenience, may be described by one or more dimensionless ratio. Shift length "λ" is the ratio of the length that the separation portion is moved upstream in the flow pathway 206 over the diameter or another average cross sectional dimension of the separation portion, taken in a direction that is perpendicular to the flow pathway 206. According to some embodiments, shift length λ is chosen to be approximately at a distance where the separation portion 204 of the viscoelastic fluid separates from the remnant portion. Other embodiments, however, may experience separation before the separation portion 204 reaches the shift length λ or after the separation portion 204 is returning toward the drop outlet 210 after having reached shift length λ. The applicant has found that shift lengths λ of up to 0.5 or greater, up to 0.75 or greater, up to 1.0 or greater, up to 1.5 or greater, up to 2.0 or greater and more may prove beneficial in producing drops repeatedly and/or of precise volumes.

According to an example embodiment, drop length "K" is used to characterize geometry of a separation portion in the flow pathway 206. Drop length K is defined by the ratio of the length of the separation portion 204, taken in a direction parallel to a longitudinal axis of the flow pathway 206, to the diameter or another average cross sectional dimension of the separation portion 204, as measured in a direction that is perpendicular to the longitudinal axis of the flow pathway 206. Various drop length K values may be used, according to different embodiments. The applicant has found, however, that drop lengths K of up to 1 or greater, up to 1.5 or greater, up to 2 or greater, up to 3 or greater and even higher values may prove beneficial to producing drops repeatedly and/or in precise volumes.

The separation portion 204 may be moved toward the drop outlet 210, after having been moved away from the drop outlet 210 to a desired shift length λ. Motion of the separation portion 204 may be stopped, with relaxation allowed to occur, or the separation portion 204 may be moved in the different direction without an appreciable pause of time in between changing direction. The separation portion 204 may move past the remnant portion 212 that is being held stationary in the feed pathway 202 as the separation portion 204 moves toward the drop outlet. Reattachment of the separation portion 204 to the remnant portion 212 may be avoided, due at least in part to the existing separation of the separation portion and the remnant portion. Existence of immiscible fluid that forms between the remnant 212 and separation portions 204 may also prevent the separation portion 204 from reattaching to the remnant portion, according to some embodiments. The separation portion 204 may then be produced from the drop outlet 210 as a drop of viscoelastic material.

According to some embodiments, a separation portion 204 of viscoelastic material undergoes additional processing ahead of being issued from the drop outlet 210. By way of non-limiting example, a coating or membrane may be applied to a separation portion 204. Additionally or alternately, a shape of the separation portion 204 may be modified, such as by a widened portion of a channel that allows the separation portion 204 to take on a spherical shape.

Various types of immiscible fluids may be used to move a separation portion 204 in a flow pathway 206. Immiscible fluids," as used herein, refers to two fluids that form two distinct phases when they are brought into contact with each other. If agitated, immiscible fluids may be mixed together temporarily but will separate into the two distinct phases over time. After agitation a small portion of one immiscible fluid may remain dissolved in the other, but the two phases will be distinct. Selection of an immiscible fluid depends on the viscoelastic fluid being processes. In some embodiments, the selection of the immiscible fluid is determined based on one or more of a difference in polarity between the molecules of the viscoelastic fluid and the molecules of the immiscible fluid (e.g., polar hydrophilic fluids are immiscible with non-polar hydrophobic fluids) and a Flory interaction parameter (χ) between the viscoelastic fluid and the immiscible fluid. Examples of immiscible pairs of fluids include water/oil, water/hexane and aqueous polymer solutions/silicone oil. Many immiscible fluids are insoluble in each other and at 25° C. a first fluid may exhibit a solubility in a second immiscible fluid of less than 1%, less than 0.1% or less than 0.01% by weight. Different mechanisms may be used to move a viscoelastic fluid and/or immiscible fluid in accordance with the techniques described herein. Some non-limiting examples of mechanisms include positive displacement syringe, peristaltic pumps and the like.

Multiple drops may be formed in succession from a common flow pathway 206, according to some embodiments. Formation of a subsequent separation portions 204 and drops may occur after a drop has been dispensed from a drop outlet 210 of the flow pathway 206. Alternately, according to some embodiments, multiple separation portions may be formed in a flow pathway 206 prior to being dispensed as drops. Multiple feed pathways 202 may feed a common flow pathway 206, according to some embodiments, to facilitate the production of multiple drops. Drops may be formed from viscoelastic materials having zero shear viscosities of different values, including values up to 100,000 Poise and higher values, particularly where the fluid experiences adequate shear thinning.

The conduits used to produce the viscoelastic drops can be made from a variety of materials depending on the fluids that are being used. Appropriate materials may include, for example, glass, polymers and metals. Polymers may be synthetic or natural and may be flexible or rigid. They may include, for instance, silicone, polyolefins, polycarbonate, fluoropolymers, polyesters, polyvinylchloride and polyurethanes. The pathways can be formed from tubing or can be molded or machined in a substrate such as PDMS. The flow pathway 206 may be formed from the same or a different material than the feed pathway 202. The surfaces that contact the viscoelastic fluid and the immiscible fluid may also be treated to alter their properties. These contact surfaces can be selected or altered to improve, for example, wettability or hydrophobicity. Hydrophobicity can be increased by reducing the surface energy of the contact surface. This can be done chemically by using a material, or treating the surface with a material or process, that results in a high contact angle with water. For example, a surface or material is considered to be hydrophobic if it exhibits a water contact angle of greater than or equal to 90° when measured using the sessile drop method. Surface energy can also be altered physically, for example, by either smoothing the surface or adding microstructures to change the resultant contact angle. In some embodiments, wettability can be minimized to improve droplet formation. For instance, if the viscoelastic fluid is aqueous, the water droplet contact angle may be greater than 60°, greater than 90° or greater than 120°. In some embodiments, the substrate may have a lower surface energy than the viscoelastic fluid. In other embodiments, the substrate may have a surface energy greater than the immiscible fluid but less than or equal to the viscoelastic fluid. Depending on the fluid being used, the channel walls may alternatively be hydrophilic, according to some embodiments.

Different sizes of drops may be formed, according to different embodiments. A lower drop size limit for any given embodiment may be controlled by the channel width. Moreover, channel widths and cross section areas may have any range of sizes that may be constructed and in which viscoelastic fluids may be moved. The pressure drop used to move a viscoelastic fluid in a particular channel geometry may control the smallest channel size that can be used. Theoretically, drops may be formed up to any size that is desirable utilizing methods described herein.

Example Method

Figure 2E:
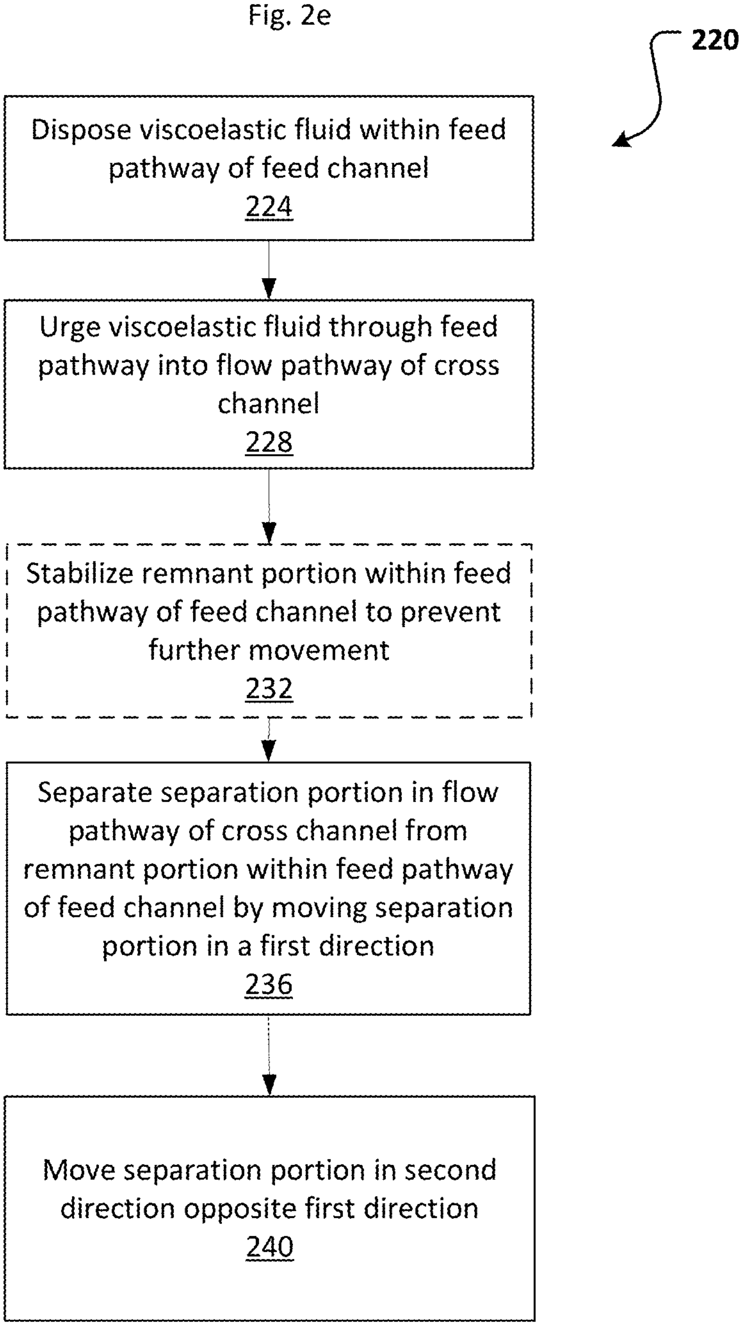
FIG. 2*e* is a method flow diagram of an example method for fabricating polymer drops, according to an embodiment of the present disclosure.

FIG. 2*e* illustrates a method 220 for fabricating a drop of polymer in which the method does not exhibit the "beads on a string" phenomenon described above. The method 220 begins by disposing 224 a viscoelastic fluid within a feed pathway of a feed channel. The viscoelastic fluid is urged 228 through the feed pathway and into a flow pathway of a cross channel. As shown in FIGS. 2*a*-2*d*, and as described above, the portion of the viscoelastic fluid in the flow pathway of the flow channel is terms a separation portion and the portion of the viscoelastic fluid remaining in the feed pathway of the feed channel is termed the remnant portion. This distinction applies even prior to separation of the separation portion from the remnant portion, referring to the disposition of the viscoelastic material with respect to the feed channel and flow channel.

The remnant portion is optionally stabilized 232 (i.e., to prevent further movement or motion) so as to prevent further movement during subsequent steps of the process 220, particularly during the process in which the separation portion is separated from the remnant portion. This, in part, facilitates discrete drop formation without generating filaments connecting the separation portion and the remnant portion, described above as the "beads on a string" phenomenon.

The separation portion disposed within the flow pathway of the cross channel is then separated 236 from the separation portion within the feed pathway of the feed channel by moving the separation portion in a first direction. In some examples, the first direction is in a direction perpendicular to a longitudinal axis of the feed pathway. In other examples, the first direction is at an acute angle to the longitudinal axis of the feed pathway so that an interface between the feed channel and the cross channel acts as a blade to facilitate separation. In some examples the force is applied to the separation portion using an immiscible fluid. This has the added benefit of acting as a cap or seal to the viscoelastic fluid remaining in the feed pathway of the feed channel, thus preventing the generation of filaments that connect to the separation portion.

The separation portion, now separated from the remnant portion, is moved 240 in a second direction opposite the first direction. In some examples, the movement in the second direction moves the separation portion over the intersection with the feed pathway and out a drop outlet. As in the preceding step, the force used to move the separation portion can be applied using an immiscible fluid.

Experiments and Results

Experiments were performed with techniques for viscoelastic fluid drop production using polymer solution concentrations of 9.09 weight percent and 0.909 weight percent PAM aqueous solution over wide ranges of zero shear viscosities of $5\times10^4$ and 10 Pa s respectively. Successful drop formation was demonstrated using both of these fluid concentrations on a macro scale cross channel (i.e., cylindrical feed channels and cross channels having 2.1 mm diameters), both with silicone oil and air as an immiscible fluid the flow pathway 206. Micro scale drop formation has also been demonstrated using the 0.909 weight percent PAM solution with silicone oil as an immiscible fluid in the flow pathway 206 (i.e., feed channels and cross channels having rectangular cross-sectional shapes with dimensions of about 200 μm by 100 μm. The polyacrylamide used for experiments performed herein was obtained from Acros Organics and had a molecular weight of 6 million grams per mole. PAM solutions described herein were aqueous solution prepared with deionized water. The silicone oil described herein was obtained from Clearco Products. Various aspects of these experiments and results are described herein.

Experiment 1—Storage and Loss Moduli

Figure 4A:
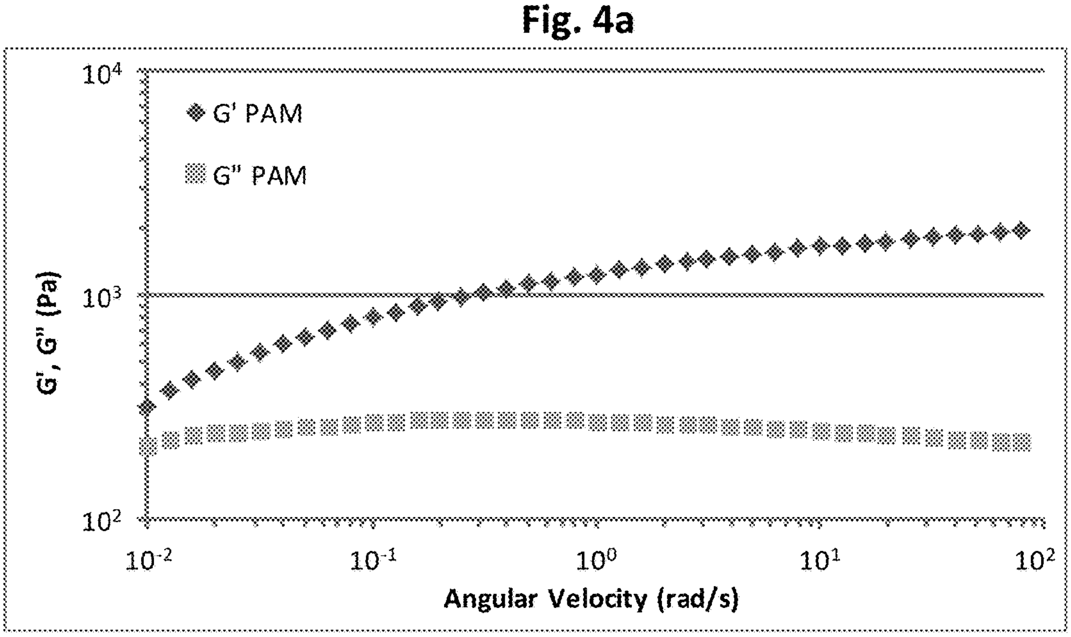
FIGS. 4*a* and 4*b* show storage (G') and loss (G") moduli as a function of angular velocity for different concentrations of a viscoelastic fluid, according to example embodiments of the present disclosure.
Figure 4B:
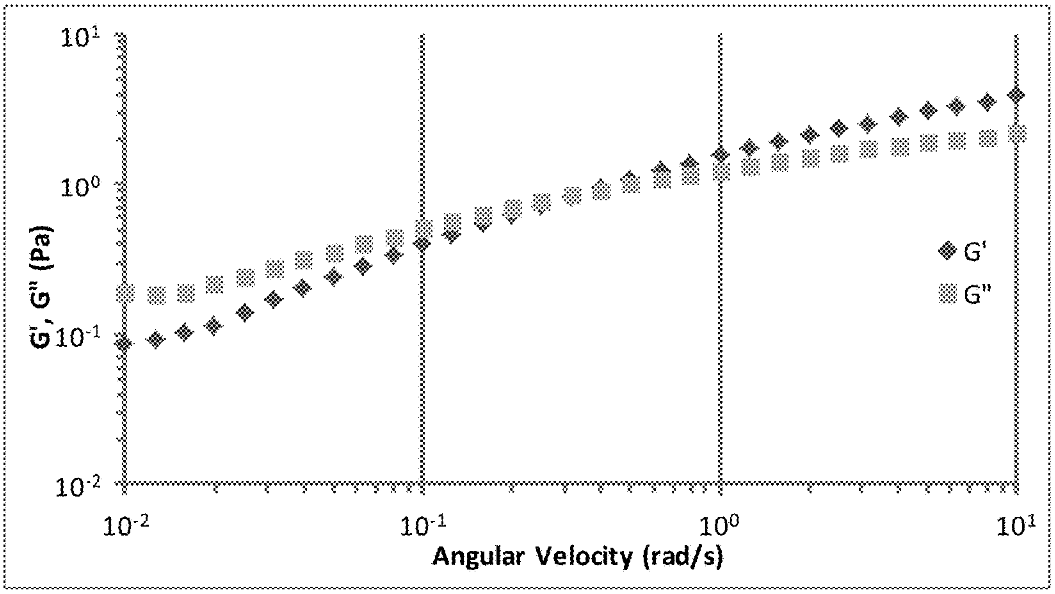

Experiment 1 measured storage modulus (G') and loss modulus (G") for particular viscoelastic fluids. Storage modulus quantifies the elastic nature of a viscoelastic fluid and loss modulus quantifies viscous behavior of a viscoelastic fluid. Ratios of these two parameters may provide a measure of the viscoelastic nature of a fluid, providing insight into any challenges in handling the fluid and/or forming drops from the fluid. FIGS. 4*a* and 4*b* show measured storage modulus and loss modulus values for two concentrations of PAM. The ratio of these two moduli is not constant but is rather dependent on the shear being applied to the fluid.

FIG. 4*a* shows storage (G') and loss (G") Moduli as a function of angular velocity for a 9.09 weight percent PAM solution for an experiment conducted at 25° C. and at a constant oscillatory stress, within the linear viscoelastic region, of 10 Pa. At low angular velocities, the difference between the elastic and viscous modulus decreases, while at higher angular velocities the elastic modulus is more dominant.

FIG. 4*b* shows storage (G') and loss (G") moduli as a function of angular velocity for a 0.909 weight percent PAM solution conducted at 25° C. and at a constant oscillatory stress, within the linear viscoelastic region, of 0.3 Pa. A crossover of the two moduli is seen at an angular velocity of 0.3 rad/s with the viscous modulus being greater at angular velocities below this threshold.

Experiment 2—Separation

Figures 5A, 5B, 5C, 5D:
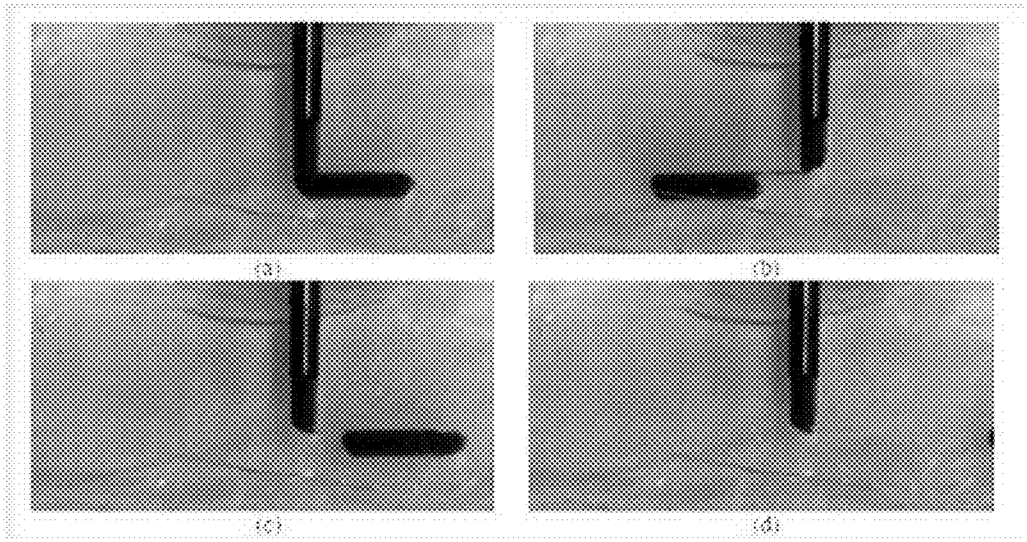
FIGS. 5*a*-5*d* show experimental results that include the formation and separation of a drop of 9.09 weight percent PAM, according to one example embodiment of the present disclosure.

In experiment 2, the formation and separation of 9.09 weight percent PAM is shown. The procedure for the experiment follows the general acts described herein with respect to FIGS. 2*a*-2*d*, with experiment results shown in FIGS. 5*a*-5*d*, respectively. A clean drop of the highly viscoelastic fluid was formed in a bulk flow of 500 cSt silicone oil. The experiment was conducted in a "T" shaped channel that includes a feed channel and a cross channel made of PDMS and having a diameter of 2.1 mm. FIG. 5*b* illustrates a tendency of the viscoelastic fluid to form thin filaments. The short filament that is connected to the two perpendicular volumes of the viscoelastic PAM solution releases from the remnant portion and merges with the separation portion when the fluid flow is reversed, as shown in FIG. 5*c*. Filament formation as the separation portion is moved away from the drop outlet may be suppressed by adjusting flow rates and/or driving pressures of the immiscible fluid that urges the separation portion through the flow pathway 206. The filament may form as a result of higher local shear at the interface.

Experiment 3—Shift Length, Drop Length, and Flow Rates

Figure 6A:
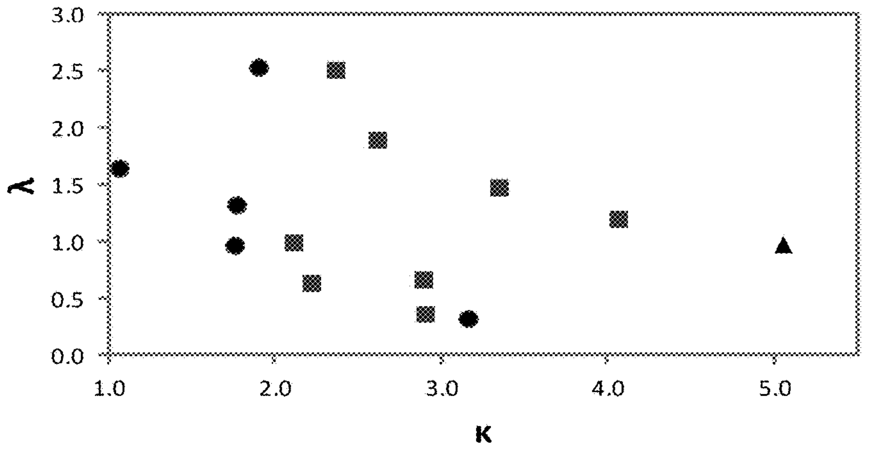
FIGS. 6*a*-6*c* show experimental results associated with experiments conducted at different shift length (λ) and drop length (K) values, according to various example embodiments of the present disclosure.
Figure 6B:
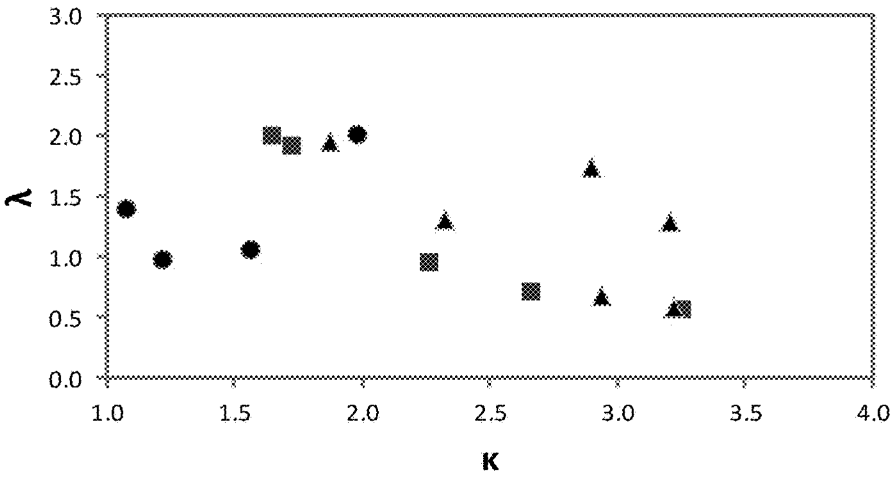
Figure 6C:
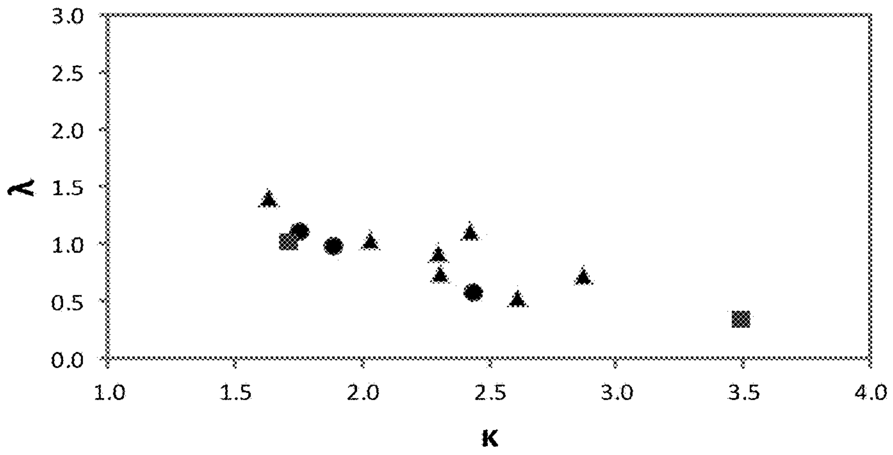

For experiment 3, a relationship between the shift length (λ) that a separation portion was shifted for a desired drop size and the flow rate used for separation portion movement in the flow pathway 206 was shown to have an effect on successful drop formation. FIGS. 6*a*-6*c* illustrate results associated with experiments conducted at different shift length (λ) and drop length (K) values at different flow rates. Experiments were conducted with cylindrical cross sections having diameters of 2 mm. The three grades for separation in these experiments are represented in FIGS. 6*a*-6*c* by a cross for a poor grade, a square for an acceptable grade, and a triangle for a good grade. Poor separation entails either no separation where the separation portion is not separated from the remnant portion or where long filaments are formed as the separation portion is moved toward the outlet. Acceptable separation has slight filament formation during separation. Good separation has limited or no filament formation as the separation portion is moved towards the outlet.

FIG. 6*a* shows a diagram for 9.09 weight percent PAM solution, including relationships between shift length (λ) and plug diameter (K) for a bulk 500 cSt silicone oil flow rate of 0.0538 mL/s (1.7 cm/s). For the flow rate of 0.0538 mL/s in FIG. 6*a*, good separation is achieved for a very long separation portion with a shift length equivalent to a length of the separation portion. In FIG. 6*a*, it appears that a K of 2 is a transition from poor to acceptable. This is the length that will fully block the flow pathway 206, preventing the immiscible fluid (e.g., oil) from seeping around the separation portion at this high of a flow rate. If oil can seep around the separation portion, the oil may cause the separation portion to deform in the radial direction, decreasing viscosity of the separation portion and negatively affecting breakup.

FIG. 6*b* shows a diagram for 9.09 weight percent PAM solution, including relationships between shift length (λ) and plug length (K) for a 500 cSt silicone oil bulk flow rate of 0.0354 mL/s (1.1 cm/s). Reducing the flow rate to 0.0354 mL/s in FIG. 6*b* improves the separation results for a similar range of drop sizes and shift lengths. A similar size cut off is present for a K of 1.5 to 2. The presence of acceptable separation occurring around a K of 1.5 indicates that a lower flow rate is less likely to seep around the separation portion. A lower flow rate may also reduce the overall shear in the system which suppresses the formation of filaments.

FIG. 6*c* shows a diagram for 9.09 weight percent PAM solution, including relationships between shift length (λ) and plug length (K) for a 500 cSt silicone bulk flow rate of 0.0148 mL/s (0.47 cm/s). The results depicted by FIG. 6*c* are similar to those of FIG. 6*b*, with good separation shown for a K range of 1.5 to 3.0 and λ from 0.5 to 2.0.

Experiment 4—Separation with Lower Concentration Viscoelastic Fluid

Figures 7A, 7B, 7C, 7D:
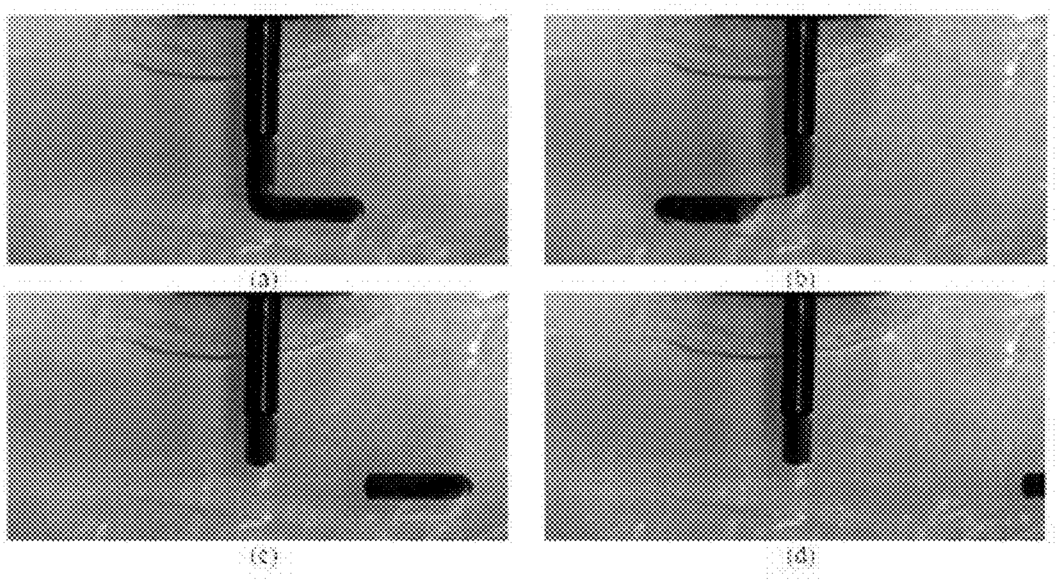
FIGS. 7*a*-7*d* show experimental results that include the formation and separation of a drop of 0.909 weight percent PAM, according to one example embodiment of the present disclosure.
Figures 8A, 8B, 8C, 8D:
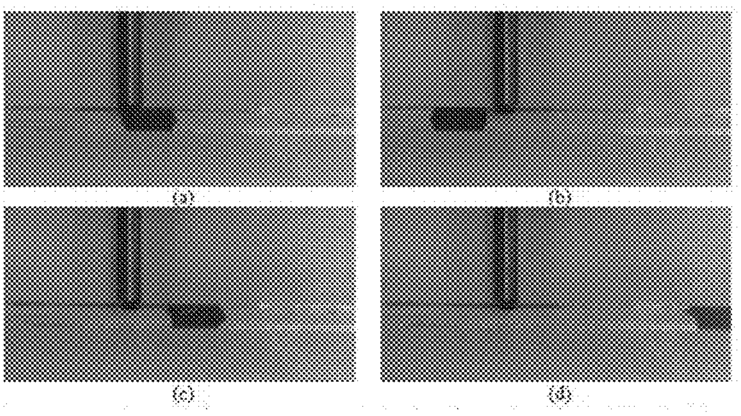
FIGS. 8*a*-8*d* show experimental results for drop production using a gas as an immiscible fluid in a flow pathway, according to one example embodiment of the present disclosure.

In experiment 4, the formation and break up of a drop of 0.909 weight percent PAM is shown. The procedure for the experiment follows the general acts described herein with respect to FIGS. 2*a*-2*d*, with experimental results shown in FIGS. 7*a*-7*d*, respectively. A clean drop of the highly viscoelastic fluid is formed in a bulk flow of 500 cSt silicone oil. The experiment is conducted in a 'T' shaped channel that includes a cylindrical feed channel and a cylindrical cross channel made of PDMS and having a diameter of 2.1 mm. FIG. 7*b* illustrates a tendency of the viscoelastic fluid to form thin filaments. The short filament that is connected to the two perpendicular volumes of the viscoelastic PAM solution merges with the separation portion when the fluid flow is reversed, as shown in FIG. 7*c*. Filament formation as the separation portion is moved away from the drop outlet may be suppressed by adjusting flow rates and/or driving pressures of the immiscible fluid that urges the separation portion through the flow pathway 206. The filament may form as a result of higher local shear at the interface. As with experiment 2, the immiscible fluid flow rate used to move the separation portion away from the drop outlet was higher than may have been desirable in experiment 4.

Experiment 5—Gas as an Immiscible Fluid

Experiment 5 showed that drop production is also possible using a gas as an immiscible fluid in the flow pathway 206, as shown in FIGS. 8*a*-8*d* where the immiscible fluid in the flow pathway 206 is air. The feed channel and cross channel for experiment 5 were cylindrical, having a diameter of 2.1 mm. Since the cross channel contains an aqueous solution during separation, the cross channel was made hydrophobic by a thin layer of silicone oil to prevent the aqueous separation portion from wetting the walls of the cross channel. The air flow rate was low enough to prevent the separation portion from rupturing during translation through the channel.

Experiment 6—Separation in Micro Scale Channels

Figures 9A, 9B, 9C, 9D:
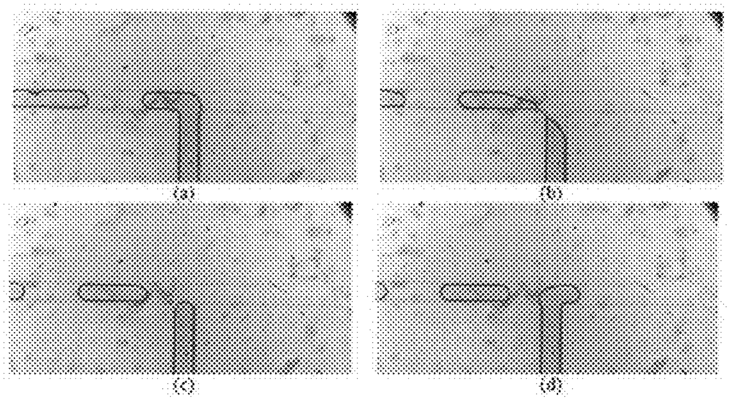
FIGS. 9*a*-9*d* show experimental results for production of a range of drop sizes performed with PAM solution in 300 μm wide microfluidic channels, according to one example embodiment of the present disclosure.

To demonstrate that a range of drop sizes may be produced, a method similar to that described with respect to FIGS. 2*a*-2*d* was performed with PAM solution in 200 μm wide, rectangular shaped microfluidic channels. Results are shown in FIGS. 9*a*-9*d*. The microfluidic channels were made of PDMS and bonded to glass microscope slides. Silicone oil was used as the immiscible fluid in the flow pathway 206. FIG. 9*b* shows the separation of the drop of PAM viscoelastic fluid from the feed channel. Separation in microfluidic channels may be limited to less concentrated polymer solutions or lower viscosity fluids. This may due to the increased pressure drop across the channel length that occurs as the channel dimensions are decreased for a given viscosity value.

FIGS. 9*a*-9*d* and FIGS. 10*a*-10*c* demonstrate the possibility of using macro scale procedures, such as described herein with respect to FIGS. 2*a*-2*d*, to achieve clean separation on the micro level. In FIG. 9*b* a slight filament formation is visible that later is absorbed into one separation portion, as shown in FIG. 9*c* where the filament is subsequently merged into a new separation portion fed to the flow pathway 206 from the feed pathway 202.

Figures 10A, 10B, 10C:
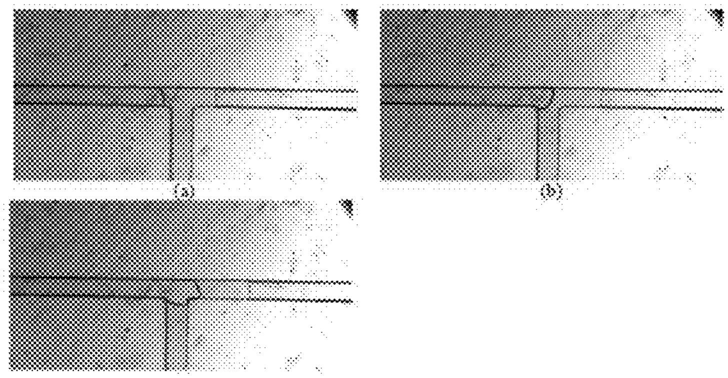
FIGS. 10*a*-10*c* show experimental results for production of drops on a micro scale using air as an immiscible fluid in a flow pathway, according to one example embodiment of the present disclosure.

FIGS. 10*a*-10*c* show clean separation results that occurred in a channel filled with air as an immiscible fluid. No filament formation was witnessed. As with the macro scale system in FIGS. 8*a*-8*d*, a hydrophobic cross channel was used to prevent wetting of the channel sides by the separation portion.

Further Considerations and Example Embodiments

While several embodiments have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of this disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of this disclosure is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, along with other embodiments that may not be specifically described and claimed.

The following examples pertain to further embodiments, from which numerous permutations and configurations will be apparent.

Example 1 is a method of producing a drop of viscoelastic fluid. The method includes moving a viscoelastic fluid through an interface and into a flow pathway 206, a remnant portion of the viscoelastic fluid remaining outside of the flow pathway 206 and preventing motion of the remnant portion. The method also includes moving the separation portion a first direction in the flow pathway 206 and moving the separation portion a second direction in the flow pathway 206 to produce the drop of viscoelastic fluid from the separation portion, the second direction opposite to the first direction.

Example 2 includes the subject matter of any of the preceding examples, and further wherein moving the viscoelastic fluid through the interface and into the flow pathway 206 includes moving a volume of viscoelastic fluid into the flow pathway 206 that is equal to a volume of the drop Example 3 includes the subject matter of any of the preceding examples, and further wherein moving the separation portion of viscoelastic fluid through the interface and into the flow pathway 206 includes filling a cross-sectional area of the flow pathway 206 with the separation portion of the viscoelastic material.

Example 4 includes the subject matter of example 3, and further wherein the flow pathway 206 is constructed and arranged such that a minimum drop volume is defined by a volume of the separation portion of viscoelastic fluid that fills the cross-sectional area of the flow pathway 206.

Example 5 includes the subject matter of any of the preceding examples 1, and further wherein moving the separation portion of viscoelastic fluid through the interface and into the flow pathway 206 includes extending viscoelastic fluid through the interface and into the flow pathway 206 from a feed pathway 202, with the remnant portion of the viscoelastic fluid remaining in the feed pathway 202.

Example 6 includes the subject matter of any of the preceding examples, and further wherein preventing motion of at least some of the viscoelastic fluid includes preventing motion of the remnant portion of the viscoelastic fluid within the feed pathway 202.

Example 7 includes the subject matter of any of the preceding examples, and further wherein preventing motion of at least some of the viscoelastic fluid includes preventing motion of the viscoelastic fluid at the interface to promote stress relaxation.

Example 8 includes the subject matter of any of the preceding examples, and further wherein preventing motion of at least some of the viscoelastic fluid includes preventing motion of the separation portion of the viscoelastic fluid within the flow pathway 206 to promote stress relaxation prior to moving the separation portion the first direction in the flow pathway 206.

Example 9 includes the subject matter of any of the preceding examples and further wherein moving the separation portion the first direction in the flow pathway 206 includes displacing the separation portion in the flow pathway 206 with an immiscible fluid.

Example 10 includes the subject matter of example 9, and further wherein the immiscible fluid is a gas.

Example 11 includes the subject matter of example 9, and further wherein the immiscible fluid is a liquid.

Example 12 includes the subject matter of any of the preceding examples, and further wherein moving the separation portion the first direction in the flow pathway 206 includes moving the separation portion in the first direction by a distance at least equal to one half of a cross-section dimension of the flow pathway 206.

Example 13 includes the subject matter of any of the preceding examples, and further wherein moving the separation portion the first direction in the flow pathway 206 includes moving the separation portion in the first direction by a distance at least equal to a cross-section dimension of the flow pathway 206.

Example 14 includes the subject matter of any of the preceding examples, and further wherein moving the separation portion the first direction in the flow pathway 206 includes moving the separation portion in the first direction by a distance at least equal to twice a cross-section dimension of the flow pathway 206.

Example 15 includes the subject matter of any of the preceding examples, and further wherein moving the separation portion the first direction in the flow pathway 206 includes moving the separation portion away from an outlet of the flow pathway 206.

Example 16 includes the subject matter of example 15, and further wherein moving the separation portion the second direction in the flow pathway 206 includes moving the separation portion toward the outlet of the flow pathway 206.

Example 17 includes the subject matter of any of the preceding examples, and further wherein moving the separation portion the second direction in the flow pathway 206 includes moving the separation portion in a manner that passes adjacent the remnant portion of the viscoelastic.

Example 18 includes the subject matter of any of the preceding examples, and further wherein moving the separation portion the second direction in the flow pathway 206 issues the drop of viscoelastic fluid from an outlet of the flow pathway 206. Example 19 includes the subject matter of any of the preceding examples, and further wherein the viscoelastic fluid is a shear thinning fluid having a viscosity that decreases as a shear rate applied to the viscoelastic shear thinning fluid increases from a zero value.

Example 20 includes the subject matter of any of examples 5-19, and further wherein the flow pathway 206 is arranged orthogonally to the feed pathway 202.

Example 21 includes the subject matter of example 20, and further wherein the flow pathway 206 lies in a cross channel having a cross sectional dimensions less than 1 millimeter.

Example 22 includes the subject matter of any of the preceding examples, and further wherein the flow pathway 206 is of a consistent cross sectional size.

Example 23 includes the subject matter of any of the preceding examples, and further wherein the flow pathway 206 is of a varying cross sectional size.

Example 24 includes the subject matter of any examples 1-22, and further wherein a channel surface facing the flow pathway 206 is exhibits a water droplet contact angle of greater than 90 degrees.

Example 25 includes the subject matter of any of the preceding examples, and further wherein the viscoelastic fluid is a liquid.

Example 26 includes the subject matter of any of examples 1-24, and further wherein the viscoelastic fluid includes a solution.

Example 27 includes the subject matter of example 26, and further wherein the viscoelastic fluid is an aqueous solution.

Example 28 includes the subject matter of example 27, and further wherein the viscoelastic fluid is an aqueous polymer solution.

All definitions, as defined herein either explicitly or implicitly through use should be understood to control over dictionary definitions, definitions in documents incorporated by reference, and/or ordinary meanings of the defined terms.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A method of producing a drop of viscoelastic fluid, the method comprising:

moving a viscoelastic fluid through a feed pathway into a flow pathway to form a separation portion of viscoelastic fluid, a remnant portion of the viscoelastic fluid remaining outside of the flow pathway, wherein the viscoelastic fluid is a shear thinning fluid having a viscosity that decreases as a shear rate applied to the shear thinning fluid increases;

preventing motion of the remnant portion;

moving the separation portion a first direction in the flow pathway to separate the separation portion from the remnant portion; and moving the separation portion a second direction in the flow pathway to produce the drop of viscoelastic fluid from the separation portion, the second direction opposite to the first direction.

2. The method of claim 1, wherein moving the viscoelastic fluid into the flow pathway includes moving a volume of viscoelastic fluid into the flow pathway that is equal to a volume of the drop.

3. The method of claim 1, wherein moving the separation portion of the viscoelastic fluid into the flow pathway includes filling a cross-sectional area of the flow pathway with the separation portion of the viscoelastic material.

4. The method of claim 2, wherein the volume of the drop is at least equal to the cross-sectional area of the flow pathway multiplied by a width of the feed pathway.

5. The method of claim 1, wherein preventing the motion of at least some of the viscoelastic fluid includes preventing motion of the remnant portion of the viscoelastic fluid within the feed pathway.

6. The method of claim 5, wherein preventing motion of at least some of the viscoelastic fluid includes preventing motion of the viscoelastic fluid at an interface between the feed pathway and the flow pathway to promote stress relaxation.

7. The method of claim 5, wherein preventing motion of at least some of the viscoelastic fluid includes preventing motion of the separation portion of the viscoelastic fluid within the flow pathway to promote stress relaxation prior to moving the separation portion in the first direction in the flow pathway.

8. The method of claim 1, wherein moving the separation portion in the first direction in the flow pathway includes displacing the separation portion in the flow pathway with a fluid immiscible relative to the viscoelastic fluid.

9. The method of claim 8, wherein the immiscible fluid is a gas.

10. The method of claim 8, wherein the immiscible fluid is a liquid.

11. The method of claim 1, wherein moving the separation portion in the first direction in the flow pathway includes moving the separation portion in the first direction by a distance at least equal to one half of a cross-section dimension of the flow pathway.

12. The method of claim 1, wherein moving the separation portion the first direction in the flow pathway includes moving the separation portion in the first direction by a distance at least equal to a cross-section dimension of the flow pathway.

13. The method of claim 1, wherein moving the separation portion in the first direction in the flow pathway includes moving the separation portion in the first direction by a distance at least equal to twice a cross-section dimension of the flow pathway.

14. The method of claim 1, wherein moving the separation portion in the first direction in the flow pathway includes moving the separation portion away from an outlet of the flow pathway.

15. The method of claim 14, wherein moving the separation portion the second direction in the flow pathway includes moving the separation portion toward the outlet of the flow pathway.

16. The method of claim 1, wherein moving the separation portion in the second direction in the flow pathway includes moving the separation portion in a manner that passes adjacent the remnant portion of the viscoelastic fluid.

17. The method of claim 1, wherein moving the separation portion the second direction in the flow pathway issues the drop of viscoelastic fluid from an outlet of the flow pathway.

18. The method claim 1, wherein the flow pathway is arranged orthogonally to the feed pathway.

19. The method of claim 1, wherein the flow pathway is defined by a cross channel, the cross channel having a rectangular cross section with dimensions less than 1 millimeter.

20. The method of claim 1, wherein the flow pathway is defined by a channel surface, wherein the channel surface exhibits a water droplet contact angle of greater than 90 degrees.

21. The method of claim 1, wherein the viscoelastic fluid is a liquid.

22. The method of claim 1, wherein the viscoelastic fluid includes a solution.

23. The method of claim 22, wherein the viscoelastic fluid is an aqueous solution.

24. The method of claim 23, wherein the viscoelastic fluid is an aqueous polymer solution.

* * * * *